US009646030B2

United States Patent
Ohtake et al.

(10) Patent No.: US 9,646,030 B2
(45) Date of Patent: May 9, 2017

(54) COMPUTER-READABLE MEDIUM STORING PROGRAM AND VERSION CONTROL METHOD

(71) Applicant: FUJITSU LIMITED, Kawasaki-shi, Kanagawa (JP)

(72) Inventors: Tomohiro Ohtake, Kawasaki (JP); Toshihiro Kodaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 180 days.

(21) Appl. No.: 14/177,999

(22) Filed: Feb. 11, 2014

(65) Prior Publication Data
US 2014/0297592 A1    Oct. 2, 2014

(30) Foreign Application Priority Data

Mar. 28, 2013    (JP) .................................. 2013-067790

(51) Int. Cl.
| G06F 7/00 | (2006.01) |
| G06F 17/00 | (2006.01) |
| G06F 17/30 | (2006.01) |
| G06F 9/44 | (2006.01) |

(52) U.S. Cl.
CPC .......... G06F 17/30309 (2013.01); G06F 8/71 (2013.01)

(58) Field of Classification Search
CPC ................................................ G06F 17/30309
USPC ........................................................ 707/695
See application file for complete search history.

(56) References Cited

U.S. PATENT DOCUMENTS

| 2004/0230560 | A1* | 11/2004 | Elza .................... G06F 17/2241 |
| 2009/0313331 | A1* | 12/2009 | Rasmussen ......... G06F 17/2288 |
| | | | 709/205 |
| 2010/0083230 | A1* | 4/2010 | Ramakrishnan .......... G06F 8/71 |
| | | | 717/121 |
| 2014/0279903 | A1* | 9/2014 | Hsiao ................ G06F 17/30377 |
| | | | 707/638 |

FOREIGN PATENT DOCUMENTS

| JP | 07-056721 | 3/1995 |
| JP | 09-097171 | 4/1997 |

(Continued)

OTHER PUBLICATIONS

Wahli Ueli et al., "Software Configuration Management, A Clear Case for IBM Rational, ClearCase and ClearQuest UCM", Dec. 2004. (Apr. 1, 2004, pp. 33-51, XP002722772) See EESR filed herewith.

(Continued)

*Primary Examiner* — Van Oberly
(74) *Attorney, Agent, or Firm* — Fujitsu Patent Center

(57) ABSTRACT

An information processing apparatus permits editing of information held by an existing node in a version control graph that contains a plurality of nodes, each of which is assigned an identifier corresponding to information held by the node. The information processing apparatus detects, upon merging a first branch and a second branch contained in the version control graph, a previous merged data set that is generated from a data set of a first version referred to by a node of the first branch and a data set of a second version referred to by a node of the second branch, on the basis of history information. The information processing apparatus generates a new merged data set by merging the first branch and the second branch, using the detected merged data set.

5 Claims, 14 Drawing Sheets

(56) References Cited

FOREIGN PATENT DOCUMENTS

JP          2002-99419      4/2002
JP          2010-176594    8/2010

OTHER PUBLICATIONS

Loeliger Jon, "Version Control with Git", (May 1, 2009, pp. 149-166, XP002722807) See EESR filed herewith.
Extended European Search Report issued for corresponding European Application No. 14155734.8, dated May 8, 2014.

\* cited by examiner

MERGE HISTORY TABLE

| PARENT TREE | MERGE RESULT |
|---|---|
| d, f | y |
| d, g | z |
| ⋮ | ⋮ |

SUB-MERGE HISTORY TABLE

| SUBTREE | MERGE RESULT |
|---------|--------------|
| d1, f1  | y1           |
| d1, g1  | z1           |
| ⋮       | ⋮            |

COMPUTER-READABLE MEDIUM STORING PROGRAM AND VERSION CONTROL METHOD

CROSS-REFERENCE TO RELATED APPLICATION

This application is based upon and claims the benefit of priority of the prior Japanese Patent Application No. 2013-067790, filed on Mar. 28, 2013, the entire contents of which are incorporated herein by reference.

FIELD

The embodiments discussed herein are related to a computer-readable medium storing a program and a version control method.

BACKGROUND

Version control systems are often used today in software development projects and the like, in order to control versions of a product such as a source code and a design specification. A typical version control system stores and manages data of a plurality of versions in a database called a repository. The version control system makes it easy to confirm the history of data updates, and enables to restore data to a previous version by canceling recent updates. Examples of version control systems include Git, Subversion, Mercurial, and so on.

The version control system also facilitates management of a project in which a plurality of version streams are worked on in parallel. For example, a process for modifying software so as to efficiently execute an existing function and a process for adding a new function to the software may be performed in parallel. In this case, the version control system separately stores two version streams (for example, 1.x versions and 2.x versions) in the repository. Each version stream is often called a "branch".

A plurality of branches may be merged afterwards. For instance, there may be a case where a source code in which an existing function is modified and a source code in which a new function is added are merged in order to test the software in the latest state to which the changes that are made to the two branches are reflected. In this case, for example, the version control system specifies a change made to one of the source codes that are to be merged and a change made to the other one of the source codes, with reference to a previous source code at the time when the branches are forked. Then, after confirming that there is no conflict between the changes, the version control system generates, as a merge result, a source code to which the changes that are made to the two branches are reflected.

Some version control systems separately manage bibliographic information (such as the relationship between versions, the date of update, the author of data, and so on) and the substance data. For example, in Git, three types of objects are stored in a repository: a "commit" containing bibliographic information; a "tree" corresponding to a directory that serves as a container for files and other directories; and a "blob" containing the content of a file. Each object is assigned an identifier calculated from information held by the object, so as to be uniquely identified in the repository.

Since the bibliographic information and the substance data are separately managed, it is possible to prevent data of the same content from being redundantly stored in the repository. For instance, it is assumed that a file of a version and a file of another version have the same content. In this case, in Git, the two blobs (files) have the same identifier, so that only one of the blobs is stored in the repository. Thus, the stored blob is referred to by the two versions.

Further, since the bibliographic information and the substance data are separately managed, it is easy to edit the bibliographic information such as the relationship between versions and the like. For example, it is assumed that a function A is changed in a version, and then a function B is changed in the next version. After that, there arises a need to alter the change history so as to reverse the order of the changes that are made to the functions A and B. In Git, the user may rearrange the order of commits, for example. In this case, since both the functions A and B are changed in the latter version, the last commit after the rearrangement refers to the same tree as that referred to by the last commit before the rearrangement. Further, in Git, the user may combine a plurality of commits, for example. In this case, a resulting combined commit refers to the same tree as that referred to by the last commit before the combining.

As a version control technique, there has been proposed a version control method that prevents changes from being incorrectly applied to or failing to be applied to a source program upon releasing the source program. According to this version control method, when a plurality of modifications are performed in parallel, versions and change records of the first completed modification are registered in a version control table. Then, upon releasing the source program with the second completed modification, the change records registered in the version control table are merged and applied to the source program (see, for example, Japanese Laid-open Patent Publication No. 9-97171).

As a way to proceed with a project, while working on a plurality of branches, these branches may be tentatively merged by using a version control system in order to check the product in the latest state. For example, software development may be proceeded with by repeating a modification of a source code in at least one or more of a plurality of branches and a test on the latest source code generated by a merge of the plurality of branches.

In this case, each time the plurality of branches are merged, the version control system may extract changes from the time when the branches are forked. However, as the amount of changes increases, the workload for a merge operation also increases. To avoid this issue, the version control system may store a previous merge result, and generate a new merge result on the basis of the previous merge result and the changes that are made after the previous merge. Upon merging a plurality of branches, it is possible to determine which previous merge result is usable, on the basis of bibliographic information stored in a repository (in the case of Git, on the basis of a commit graph representing a set of commits, for example).

However, as mentioned above, in some version control systems, the user may edit the bibliographic information. If the bibliographic information is edited after a merge is performed, the bibliographic information after the editing is different from the bibliographic information before the editing. Therefore, upon performing a merge again, it is difficult to find a previous merge result. For example, in Git, if a change (including those that alter the relationship between commits, such as rearranging commits, combining commits, and the like) is made to a commit, the identifier of the commit is changed even when the commit refers to the same tree. Accordingly, if a commit is changed, it is difficult to determine which commits are previously merged only on the basis of the commit graph.

SUMMARY

According to one aspect of the invention, there is provided a non-transitory computer-readable storage medium storing a computer program that causes a computer to perform a process including: permitting editing of information held by an existing node in a version control graph that contains a plurality of nodes and represents a relationship among a plurality of versions, each of the nodes referring to any of data sets of the plurality of versions and being assigned an identifier corresponding to information held by the node; detecting, upon merging a first branch and a second branch contained in the version control graph, a previous merged data set that is generated from a data set of a first version referred to by a node of the first branch and a data set of a second version referred to by a node of the second branch, on the basis of history information indicating a correspondence between data sets of two or more versions that are previously merged and a resulting merged data set; and generating a new merged data set by merging the first branch and the second branch, using the detected previous merged data set.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 illustrates an example of a merge history table;

FIG. 13 illustrates an example of a sub-merge history table; and

DESCRIPTION OF EMBODIMENTS

Figure 1:
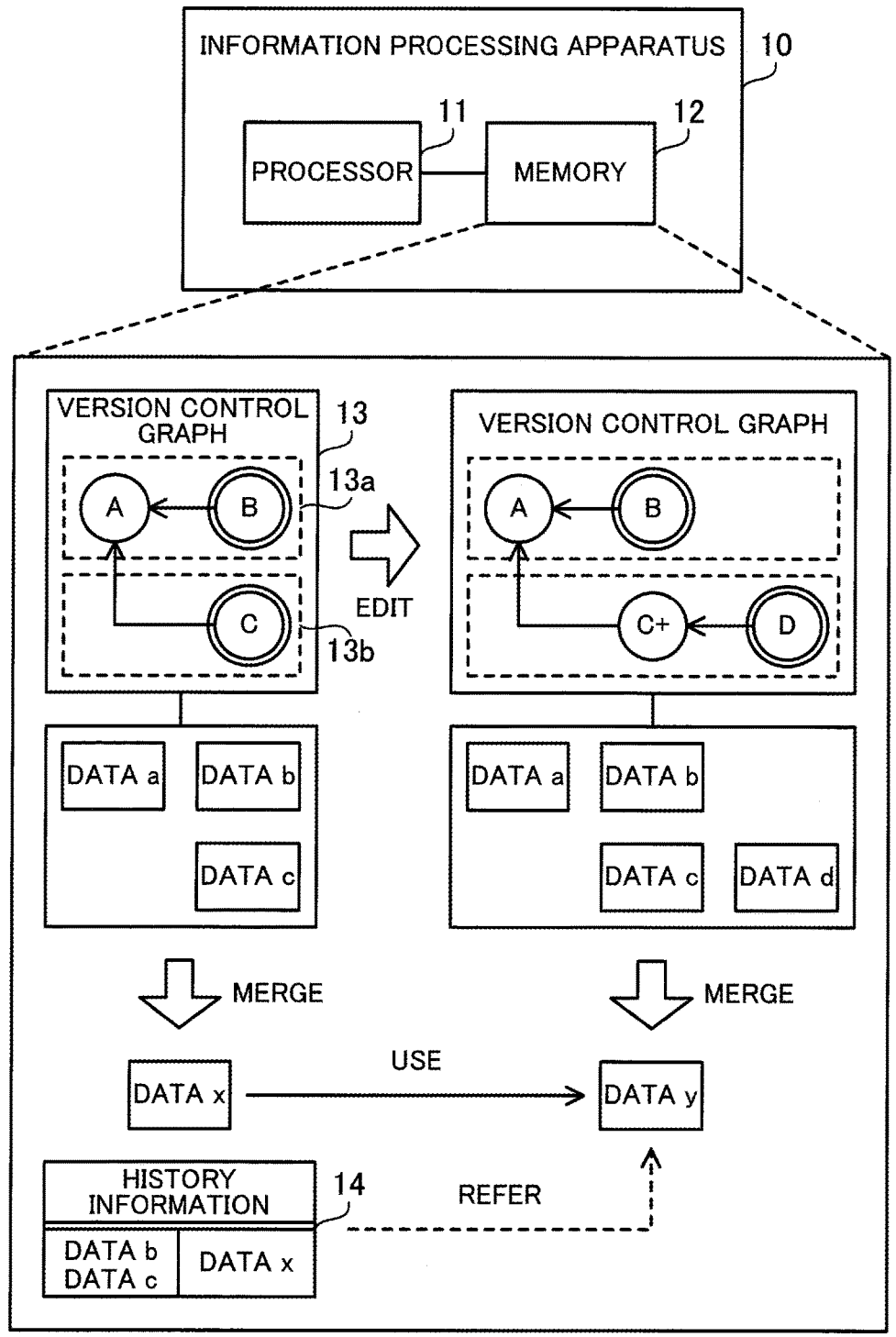
FIG. 1 illustrates an information processing apparatus according to a first embodiment.

Several embodiments will be described below with reference to the accompanying drawings, wherein like reference numerals refer to like elements throughout.

(a) First Embodiment

FIG. 1 illustrates an information processing apparatus 10 according to a first embodiment.

The information processing apparatus 10 controls versions of the product created by a project. For example, the information processing apparatus 10 manages versions of a source code and other documents (for example, a design specification and so on) created by a software development project. The information processing apparatus 10 may be realized by using a computer, for example. The information processing apparatus 10 may be a terminal apparatus that is operated by the user, or may be a server that is accessed by multiple terminal apparatuses.

The information processing apparatus 10 includes a processor 11 and a memory 12. The processor performs a merge of branches as will be described below. The processor 11 may include a central processing unit (CPU), a digital signal processor (DSP), an application specific integrated circuit (ASIC), a field programmable gate array (FPGA), and the like. The processor 11 executes a program stored in the memory 12, for example. The processor 11 may be a "multiprocessor" that includes a plurality of processors. The memory 12 stores a version control graph 13 and history information 14. The memory 12 may be a main storage device such as a random access memory (RAM) or the like, for example. However, a secondary storage device such as a hard disk drive (HDD) and a flash memory may be referred to as a "memory".

The version control graph 13 is a graph that represents the relationship among versions, and contains a plurality of nodes. Each node has information on reference to any of data sets of a plurality of versions, a relationship with a node corresponding to another version (for example, reference to a parent node corresponding to the parent version on which the current version is based), and the like. Each node is assigned an identifier corresponding to the information held by the node, such as a hash of the information held by the node or the like. The version control graph 13 contains branches 13a and 13b which are worked on in parallel.

For example, the version control graph 13 contains nodes A, B, and C. The node A corresponds to a first version, and refers to a data set a. The node B corresponds to a second version created on the basis of the first version, and refers to a data set b that is obtained by modifying the data set a. The node C corresponds to a third version created on the basis of the first version and existing parallel to the second version, and refers to a data set c that is obtained by modifying the data set a. The nodes A and B belong to the branch 13a, and the node C belongs to the branch 13b. The data sets a, b, and c that are referred to by the nodes A, B, and C, respectively, may be stored in the information processing apparatus 10, or may be stored in a storage device provided outside the information processing apparatus 10.

The processor 11 merges the branches 13a and 13b in the version control graph 13. The merge of the branches 13a and 13b is performed in response to an input of a merge command from the user. For example, the processor 11 generates a merged data set x from the data set b that is referred to by the last node B of the branch 13a, and the data set c that is referred to by the last node C of the branch 13b. As in the case of the data sets a, b, and c, the generated data set x is stored in a repository for later use, as will be described below. Further, the processor 11 stores, in the history information 14, the correspondence between data sets of two or more versions that are merged and a resulting merged data set. For example, the processor 11 stores the identifiers of the data sets b and c that are merged and the identifier of the resulting merged data set x, in association with each other.

Then, the processor 11 permits editing of information held by an existing node in the version control graph 13. Editing of information held by the node may include editing that does not alter the graph structure (such as changing the date of update, changing the author of data, and so on), and may include editing that alters the graph structure (such as rearranging nodes, combining nodes, and so on). When the information of the node is edited, the identifier of the node is changed. However, the node may refer to the same data set. For example, when the information of the node C of the branch 13b is edited, the node C is changed to a node C+. However, as in the case of the node C, the node C+ refers to the data set c.

Further, after the branches 13a and 13b are merged, a node corresponding to a new version may be added to the version control graph 13. For example, a node D is added to the branch 13b. The node D corresponds to a fourth version created on the basis of the third version, and refers to a data set d that is obtained by modifying the data set c. In the case where the node D is added after the information of the node C is edited, the node D is associated with the node C+. For example, the node D refers to the node C+. In the case where the information of the node C is edited after the node D is added to the branch 13b, the information held by the node D may be edited together.

Then, the processor 11 merges again the branches 13a and 13b in the version control graph 13. In this step, the processor 11 detects, from the history information 14, the previous merged data set which is generated from the data set referred to by the node of the branch 13a and the data set referred to by the node of the branch 13b. In the case where the previous merged data set is present, the processor 11 generates a new merged data set y for the branches 13a and 13b, using the previous merged data set.

For example, the processor 11 detects the data set x, which is generated from the data set b referred to by the node B of the branch 13a and the data set c referred to by the node C+ of the branch 13b, from the history information 14. Then, the processor 11 generates a new merged data set y from the previous merged data set x and the data set d that is referred to by the node D which is added after the previous merge. In the case where the data set x is not registered in the history information 14, the processor 11 generates the data set y from the data set b and the data set d. In the case of generating the data set y from the data sets x and d, the amount of changes that are extracted is reduced and hence the workload for the merge is reduced, compared to the case where of generating the data set y from the data sets b and d without using a previous merge result.

According to the first embodiment of the information processing apparatus 10, even if an existing node in the version control graph 13 is edited and thus the identifier of the node is changed, it is possible to determine which merge result has been previously generated from which data sets by referring to the history information 14. Accordingly, upon merging a plurality of branches, there is a higher chance of detecting a usable previous merge result, compared to the case of detecting a usable previous merge result only from the version control graph 13. Accordingly, it is possible to reduce the amount of calculation and the number of times of access to the repository for extracting changes, and thus to reduce the workload for merging a plurality of branches.

(b) Second Embodiment

Hereinafter, a second embodiment will be described. An information processing apparatus 100 of the second embodiment controls versions of a source code created by a software development project. The version control system of the second embodiment may be Git, for example.

Figure 2:
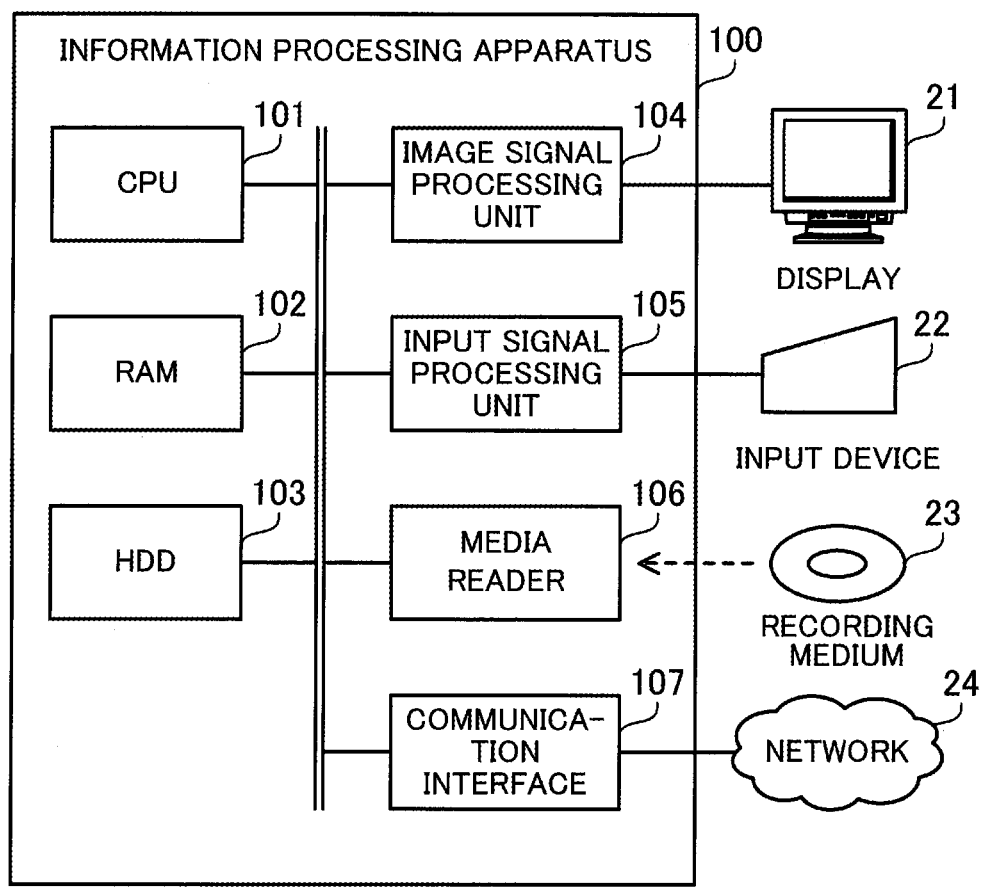
FIG. 2 illustrates an exemplary hardware configuration of the information processing apparatus.

FIG. 2 illustrates an exemplary hardware configuration of the information processing apparatus 100.

The information processing apparatus 100 includes a CPU 101, a RAM 102, an HDD 103, an image signal processing unit 104, an input signal processing unit 105, a media reader 106, and a communication interface 107. The CPU 101 is an example of the processor 11 of the first embodiment, and the RAM 102 (or the HDD 103) is an example of the memory 12 of the first embodiment.

The CPU 101 is a processor including an arithmetic circuit that executes instructions of a program. The CPU 101 loads at least part of a program and data stored in the HDD 103 into the RAM 102 so as to execute the program. The CPU 101 may include a plurality of processor cores, and the information processing apparatus 100 may include a plurality of processors. Thus, the operations described below may be executed in parallel by using a plurality of processors or processor cores. A set of processors (a multiprocessor) may be referred to as a "processor".

The RAM 102 is a volatile memory that temporarily stores a program executed by the CPU 101 and data used for processing by the CPU 101. The information processing apparatus 100 may include other types of memories than a RAM, and may include a plurality of memories.

The HDD 103 is a non-volatile storage device that stores software programs (such as an operation system (OS), application software, and so on) and data. The information processing apparatus 100 may include other types of storage devices such as a flash memory, a solid state drive (SSD), and the like, and may include a plurality of non-volatile storage devices.

The image signal processing unit 104 outputs an image to a display 21 connected to the information processing apparatus 100, in accordance with an instruction from the CPU 101. Examples of the display 21 include a cathode ray tube (CRT) display, a liquid crystal display (LCD), a plasma display panel (PDP), an organic electro-luminescence display (GELD), and the like.

The input signal processing unit 105 obtains an input signal from an input device 22 connected to the information processing apparatus 100, and outputs the input signal to the CPU 101. Examples of the input device 22 include pointing devices (such as a mouse, a touch panel, a touch pad, a trackball, and so on), a keyboard, a remote controller, button switches, and the like. A plurality of types of input devices may be connected to the information processing apparatus 100.

The media reader 106 is a drive that reads a program and data stored in a recording medium 23. Examples of the recording medium 23 include magnetic discs (such as a flexible disk (FD), an HDD, and so on), optical discs (such as a compact disc (CD), a digital versatile disc (DVD), and so on), magneto-optical discs (MO), semiconductor memories, and the like. The media reader 106 reads, for example, a program and data from the recording medium 23, and stores the read program and data in the RAM 102 or the HDD 103.

The communication interface 107 is an interface that communicates with other information processing apparatuses via a network 24. The communication interface 107 may be a wired interface that connects to a communication apparatus with a cable, or may be a radio interface that connects to a base station by radio.

The information processing apparatus 100 does not have to include the media reader 106. Further, in the case where the information processing apparatus 100 may be controlled from a terminal apparatus via a network, the information processing apparatus 100 does not have to include the image signal processing unit 104 or the input signal processing unit 105.

Figure 3:
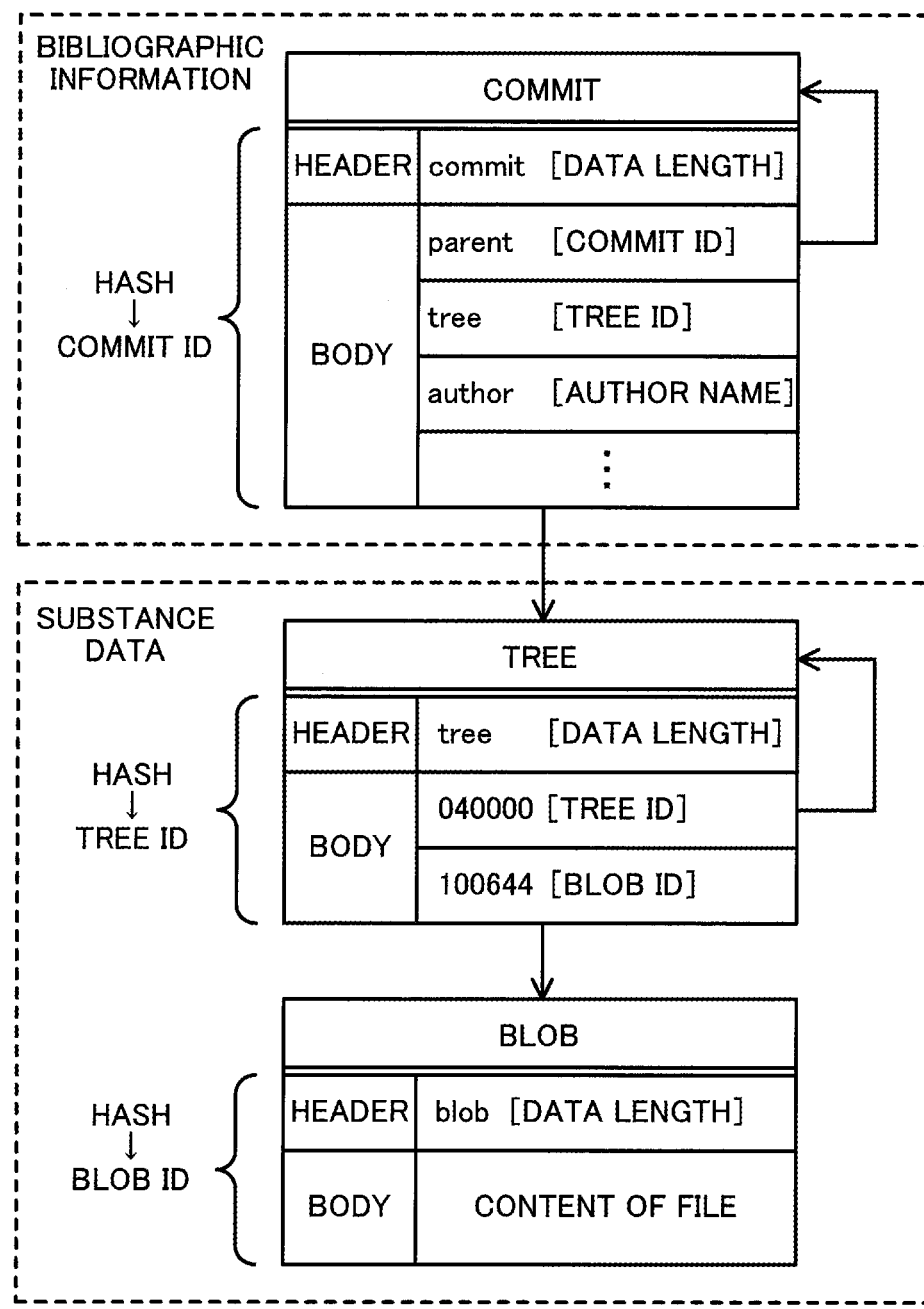
FIG. 3 illustrates exemplary structures of objects stored in a repository.

FIG. 3 illustrates exemplary structures of objects stored in a repository.

In the version control system of the second embodiment, it is assumed that a set of files related to a single project is stored in a tree structure having a single directory (root directory) at the top, in a file system. In one directory, another directory (subdirectory) or a source code file may be located.

Three types of objects are stored in a repository of the version control system: a "commit"; a "tree"; and a "blob". A commit corresponds to a version. A tree corresponds to a directory in a certain state, and a blob corresponds to a file in a certain state. That is, a commit represents the bibliographic information of a version, while a set of trees and blobs represent the substance data in the file system.

The header of the commit contains a character string "commit" and the data length of the body. The body of the commit contains the tree ID of one of the trees, together with a tag "tree". The tree that is referred to by the commit is a root tree corresponding to a root directory of the version indicated by the commit. The body of the commit may contain the commit ID of one or more other commits (parent commits), together with a tag "parent". The parent commit referred to by the current commit indicates the immediately previous version on which the version indicated by the current commit is based. However, there may be a commit that does not contain the "parent" field (commit not having a parent commit to refer to), such as a commit corresponding to the first version. The body of the commit may contain other information such as the name of the author, the date of update, and so on.

The header of the tree contains a character string "tree" and the data length of the body. The body of the tree may contain the tree ID of one or more other trees (subtrees), together with a tag "040000" indicating that the data type is a tree. The subtree referred to by the tree indicates a subdirectory directly under the directory indicated by the tree. The body of the tree may contain the blob ID of one or more blobs, together with a tag "100644" indicating that the data type is a blob. The blob referred to by the tree indicates a file directly under the directory indicated by the tree. However, there may be a tree that does not contain the item "040000" (tree not having a subtree to refer to). There also may be a tree that does not contain the item "100644" (tree not having a blob to refer to).

The header of the blob contains a character string "blob" and the data length of the body. The body of the blob contains the content of a file such as a source code.

The header and body of each object are compressed such that the object is stored in the repository as a compressed file. Each objet is assigned a 160-bit (40 hexadecimal digit) value as the object ID. The repository stores object IDs and compressed files in association with each other such that a desired compressed file may be extracted on the basis of the object ID. The repository may be a key-value based database, for example.

The object ID is a hash of the header and body of an object, which is calculated using a hash function that outputs a 160-bit value. That is, the object ID (the commit ID) of a commit is a hash of the header and body of the commit. The object ID (the tree ID) of a tree is a hash of the header and body of the tree. The object ID (the blob ID) of a blob is a hash of the header and body of the blob. The probability that the same hash values are generated from objects of different contents (the probability of a hash conflict) is sufficiently small.

Figure 4:
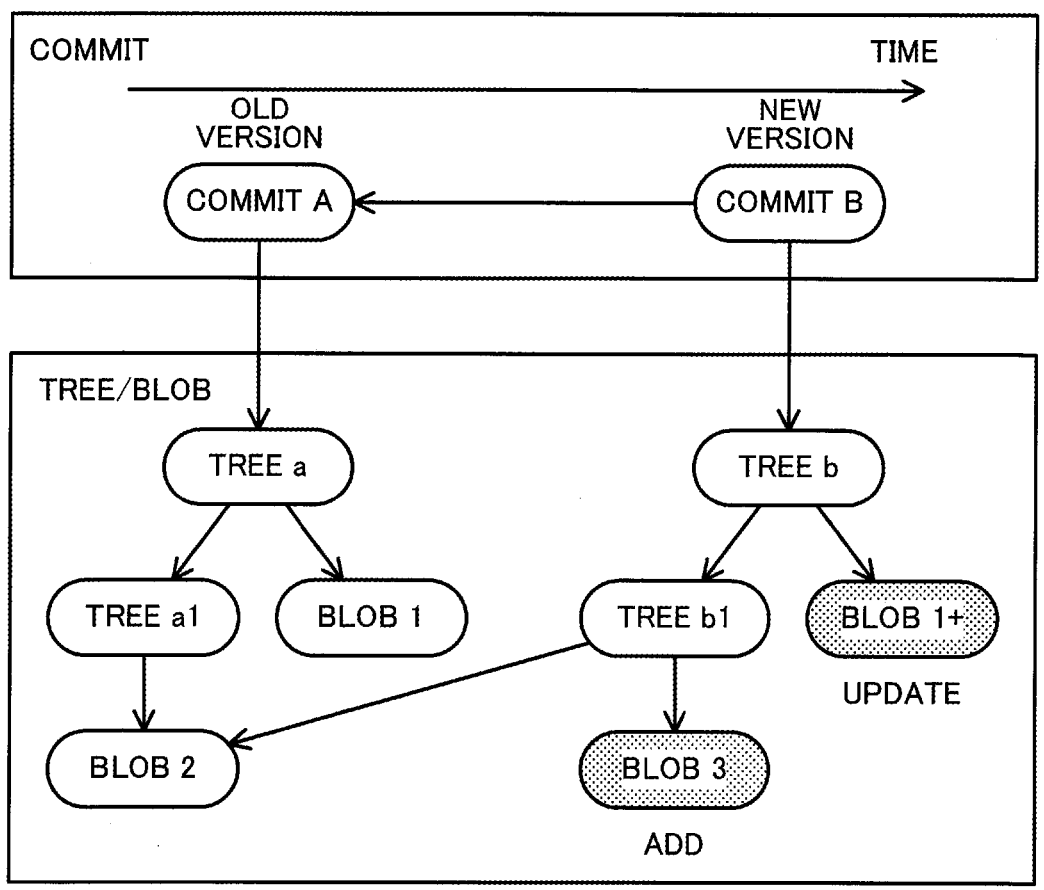
FIG. 4 illustrates an example of a reference relationship among commits, trees, and blobs.

FIG. 4 illustrates an example of a reference relationship among commits, trees, and blobs.

A commit A refers to a tree a. The tree a is a root tree, and corresponds to a root directory of the version indicated by the commit A. The tree a refers to a tree a1 as a subtree, and a blob 1. The tree a1 refers to a blob 2. A set of the trees a and a1 and the blobs 1 and 2 which are reachable from the commit A corresponds to the substance data of the version indicated by the commit A in the file system.

A commit B indicates the next version created by modifying the data of the version indicated by the commit A, and refers to the commit A as a parent commit. The commit B refers to a tree b. The tree b is a root tree, and corresponds to a root directory of the version indicated by the commit B. The tree b refers to a tree b1 as a subtree, and a blob 1 +. The tree b1 refers to the blob 2 and a blob 3. A set of the trees b and b1 and the blobs 1+, 2, and 3 which are reachable from the commit B corresponds to the substance data of the version indicated by the commit B in the file system.

The substantial changes from the version of the commit A and the version of the commit B are that the content of the blob 1 is rewritten and updated to the blob 1+, and that the blob 3 is added under the tree a1. Since the content of the blob 1+ is different from that of the blob 1, the blob 1+ is assigned a blob ID different from that of the blob 1. Thus, the blob 1+ is stored in the repository separately from the blob 1. On the other hand, the content of the blob 2 is not changed, so that its blob ID remains the same. Thus, the blob 2 is not stored redundantly in the repository, and is referred to by both the trees a1 and b1.

Further, the content of the tree b1 is changed from that of the tree a1 in that the reference to the blob 3 is added. Therefore, the tree b1 is assigned a tree ID different from that of the tree a1. Thus, the tree b1 is stored in the repository separately from the tree a1. The content of the tree b is changed from that of the tree a in that the tree ID of the tree b 1 referred to by the tree b is different from that of the tree a1, and the blob ID of the blob 1+ referred to by the tree b is different from that of the blob 1. Therefore, the tree b is assigned a tree ID different from that of the tree a, and is stored in the repository separately from the tree a.

In this way, adding, updating, and removing a blob affects all trees on the path from the root tree to the blob. An updated blob and an affected tree are added to the repository as a blob and a tree different from the blob and tree of the previous version. On the other hand, a blob that is not updated and a tree that is not affected are not redundantly added to the repository. Thus, the blob and tree that have been previously stored in the repository are referred to.

Next, a branch and a merge of a plurality of branches will be described.

Figure 5:
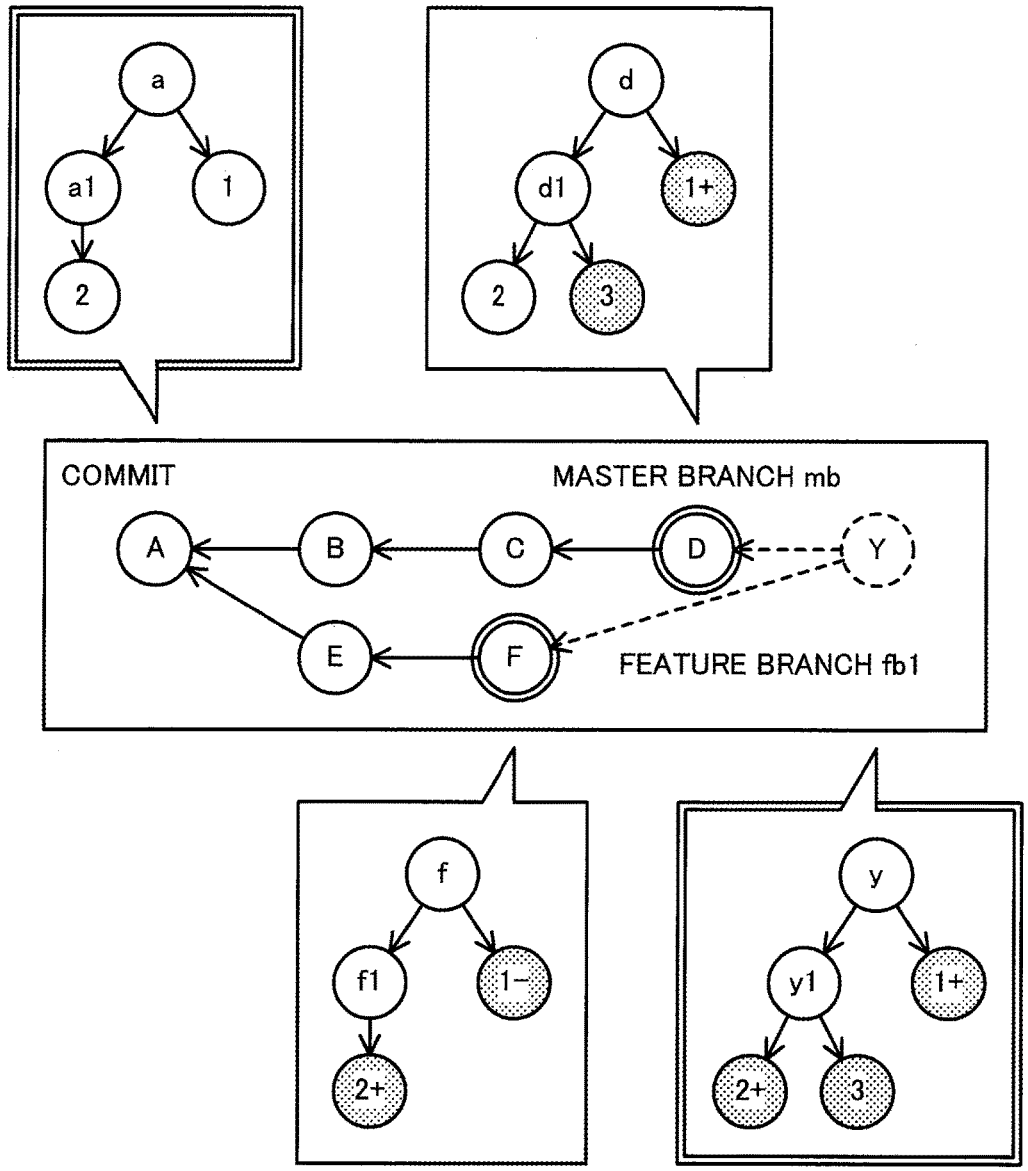
FIG. 5 illustrates an example of merging branches.

FIG. 5 illustrates an example of merging branches.

In some software development projects, developments of a plurality of version streams often proceed in parallel. For example, a process for maintaining the existing source code for higher security, higher performance, and the like, and a process for writing a new source code in order to add a new function to the software may be performed in parallel. A stream of versions connected in series is often called a branch. Among a plurality of branches, a central branch of the software development may be called a master branch (or may be called a main line or a trunk). On the other hand, a branch forked from the master branch is called a feature branch. The feature branch is to be merged into the master branch afterwards.

A commit graph may be created on the basis of the set of commits described above, in which each node represents a commit and each edge represents a reference relationship among commits. In the commit graph, a stream of commits connected in series corresponds to a branch. A feature branch in the commit graph is forked from any of the commits of the master branch. For example, a master branch mb containing a commit sequence (A, B, C D) and a feature branch fb1 forked from the commit A and containing a commit sequence (E, F) are represented in a commit graph.

The user refers to one of the commits of each branch as a working commit. In many cases, the user works on the last commit (the last added commit) of a commit sequence. For example, as for the master branch mb, the commit D is currently being referred to. As for the feature branch fb1, the commit F is currently being referred to. When adding a new commit to a branch, the new commit is added immediately after the working commit.

The master branch mb and the feature branch fb1 are merged in accordance with a merge command that is input by the user. For example, the commit A refers to a tree a; the commit D refers to a tree d; and the commit F refers to a tree f. Blobs 1 and 2 are reachable from the tree a; blobs 1+, 2, and 3 are reachable from the tree d; and blobs 1− and 2+ are reachable from the tree f. That is, in the master branch mb, after the feature branch fb1 is forked from the master branch mb, the blob 1 is updated to the blob 1+, and the blob 3 is added. Meanwhile, in the feature branch fb1, the blob 1 is updated to the blob 1−, and the blob 2 is updated to the blob 2+.

A set of trees and blobs as the merge result is obtained by merging the changes to the master branch mb and the changes to the feature branch fb1 so as not to cause a conflict. The information processing apparatus 100 detects a common commit reachable from the last (or the current working) commit D of the master branch mb and the last (or the current working) commit F of the feature branch fb1, from the commit graph. The commit searched for in this step is the closest common commit of the commits D and F. In this example, the commit A at the fork of the two branches is detected as a common commit.

Then, the information processing apparatus 100 extracts changes to the master branch mb by calculating the difference between the tree d referred to by the commit D and the tree a referred to by the commit A. In this example, the update from the blob 1 to the blob 1+ and the addition of the blob 3 are extracted. Further, the information processing apparatus 100 extracts changes to the feature branch fb1 by calculating the difference between the tree f referred to by the commit F and the tree a referred to by the commit A. In this example, the update from the blob 1 to the blob 1− and the update from the blob 2 to the blob 2+ are extracted.

Then, the information processing apparatus 100 adopts the changes that do not cause a conflict between the branches to be merged, to the merge result. In this example, the information processing apparatus 100 automatically adopts the addition of the blob 3 and the update from the blob 2 to the blob 2+. On the other hand, as for the blob to which different changes have been made in two or more branches, the information processing apparatus 100 confirms with the user which change to adopt. In this example, the information processing apparatus 100 adopts the update to the blob 1+, out of the update from the blob 1 to the blob 1+ and the update from the blob 1 to the blob 1−, in accordance with an instruction from the user. The information processing apparatus 100 applies the adopted changes to the tree a, and generates a tree y as the merge result. However, in the case where the update to the blob 1+ and the update to the blob 1− are for updating the different portions of the file, the changes made by both the updates may be merged.

A commit Y referring to the generated tree y as a root tree and referring to the commits D and F as parent commits may be added to the commit graph so as to be visible to the user. However, in the second embodiment, it is assumed that an operation mode that repeats a merge of source codes and a test is used, so that a commit visible to the user is not added every time a merge is performed. Instead, the information processing apparatus 100 stores the commit Y and the tree y corresponding to the merge result in the repository so as to be invisible to the user. Commits and trees invisible to the user are used internally upon the next merge.

Figure 6:
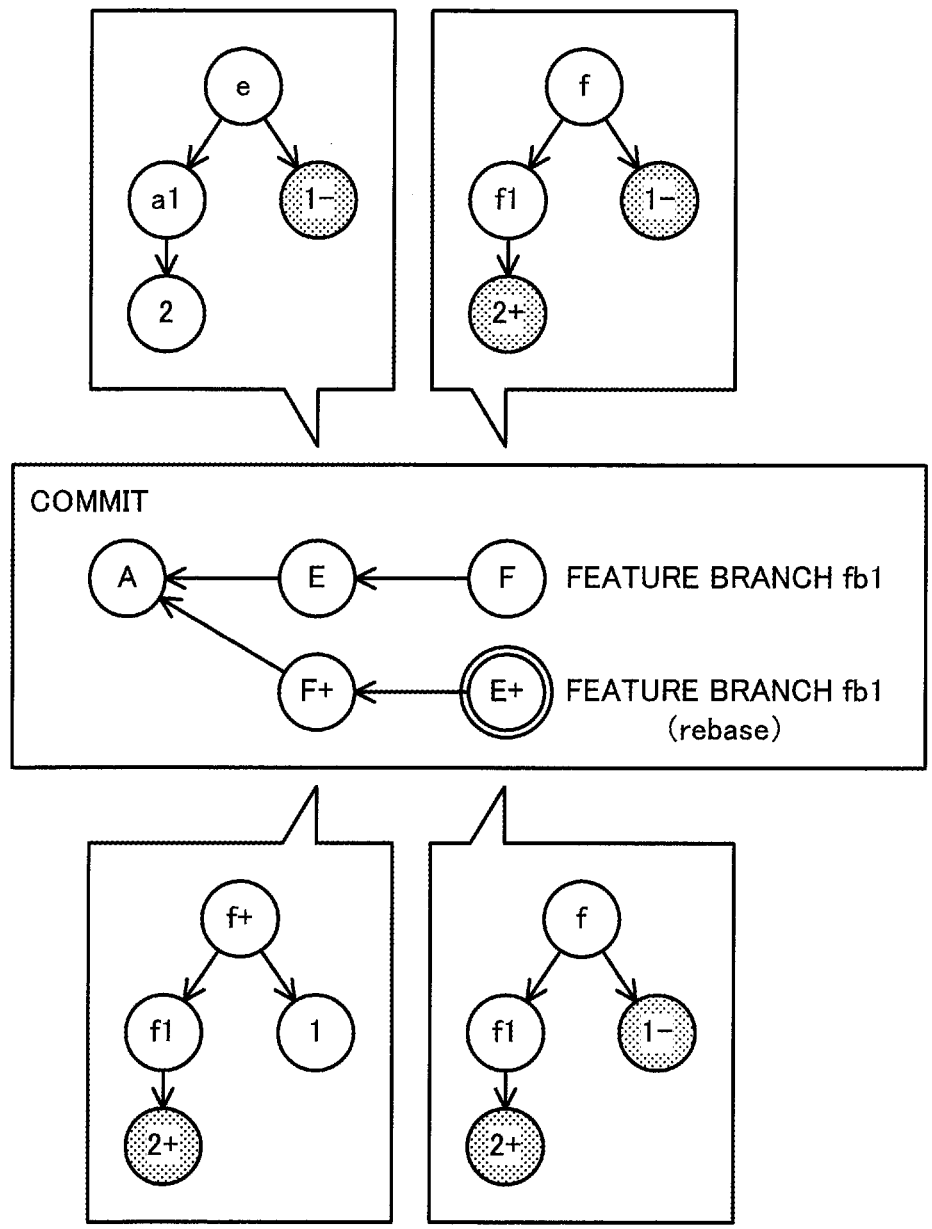
FIG. 6 illustrates an example of a rebase operation on a commit.

FIG. 6 illustrates an example of a rebase operation on a commit.

After adding a commit to the repository, the information processing apparatus 100 often edits the commit in accordance with a command input by the user. Examples of editing a commit include rearranging two or more nodes in the same branch, combining nodes, and the like. Rearranging commits may be performed when a change to a version and a change to the next version need to be regarded as being made in the reverse order to the order in which these changes are actually made, for the purpose of the management of the project. Combining commits may be performed when a small change to a version and a small change to the next version need to be regarded as being made at the same time, for the purpose of the management of the project.

The following describes an example of rearranging (switching) the commits E and F in the feature branch fb1. Rearranging commits is often called a "rebase". In this example, the commit E refers to the tree e. The blobs 1− and 2 are reachable from the tree e. As mentioned before, the commit F refers to the tree f. That is, in the feature branch fb1, the update from the blob 1 to the blob 1− is performed first, and then the update from the blob 2 to the blob 2+ is performed. Switching the commits E and F means regarding that the update from the blob 2 to the blob 2+ is performed first, and then the update from the blob 1 to the blob 1− is performed.

When the commits E and F are switched by the rebase, a commit F+ referring to the commit A as a parent commit and a commit E+ referring to the commit F as a parent commit are added to the repository. The commit F+ corresponds to the commit F before the rebase, and the commit E+ corresponds to the commit E before the rebase. Further, a tree f+ is added to the repository as a root tree. The blobs 1 and 2+ are reachable from the tree f+.

The commit F+ refers to the tree f+. This means that the update from the blob 2 to the blob 2+ is performed first. The commit E+ refers to the tree f. This means that the update from the blob 1 to the blob 1− is performed after the update from the blob 2 to the blob 2+. Since the reference relationship between the commits is changed, the commit IDs of the commits F+ and E+ are different from the commit ID of the commits E and F. Further, since the blob that is first updated is replaced, the tree ID of the tree f+ referred to by the commit F+ is different from those of the trees e and f. On the other hand, the tree f referred to by the last commit E+ after the rebase is the same as that referred to by the last commit F before the rebase. This is because simply rearranging the order of the commits does not make the final cumulative changes differ from the changes before the rearrangement.

The commits E and F are not removed from the repository immediately after the commits F+ and E+ are added to the repository by the rebase. The commits E and F that are no longer needed are removed afterwards by regular garbage collection. In the garbage collection process, the information processing apparatus 100 detects an isolated objet that is not referred to by other objects, on the basis of the reference relationship among objects.

For example, the commit E+ after the rebase is referred to by the user as a working commit, while the commit F before the rebase may be no longer referred to by the user. Therefore, in the garbage collection process, the commit E+ is not removed. Further, the commit F+ is referred to by the commit E+ and therefore is not removed, and the commit A is referred to by the commit F+ and therefore is not removed. On the other hand, the commit F is removed as an isolated object, and the commit E which becomes an isolated object due to the removal of the commit F is removed. Further, the tree f is referred to by the commit E+ and therefore is not removed, and the tree f+ is referred to by the commit F+ and therefore is not removed. On the other hand, the tree e is removed due to the removal of the commit E.

The interval of the garbage collection may be specified by the user in the information processing apparatus 100. The interval may be determined in view of the balance between the free space in the repository and the workload on the information processing apparatus 100. For example, the interval of the garbage collection may be set to two weeks.

Next, merging branches using a previous merge result will be described.

Figure 7:
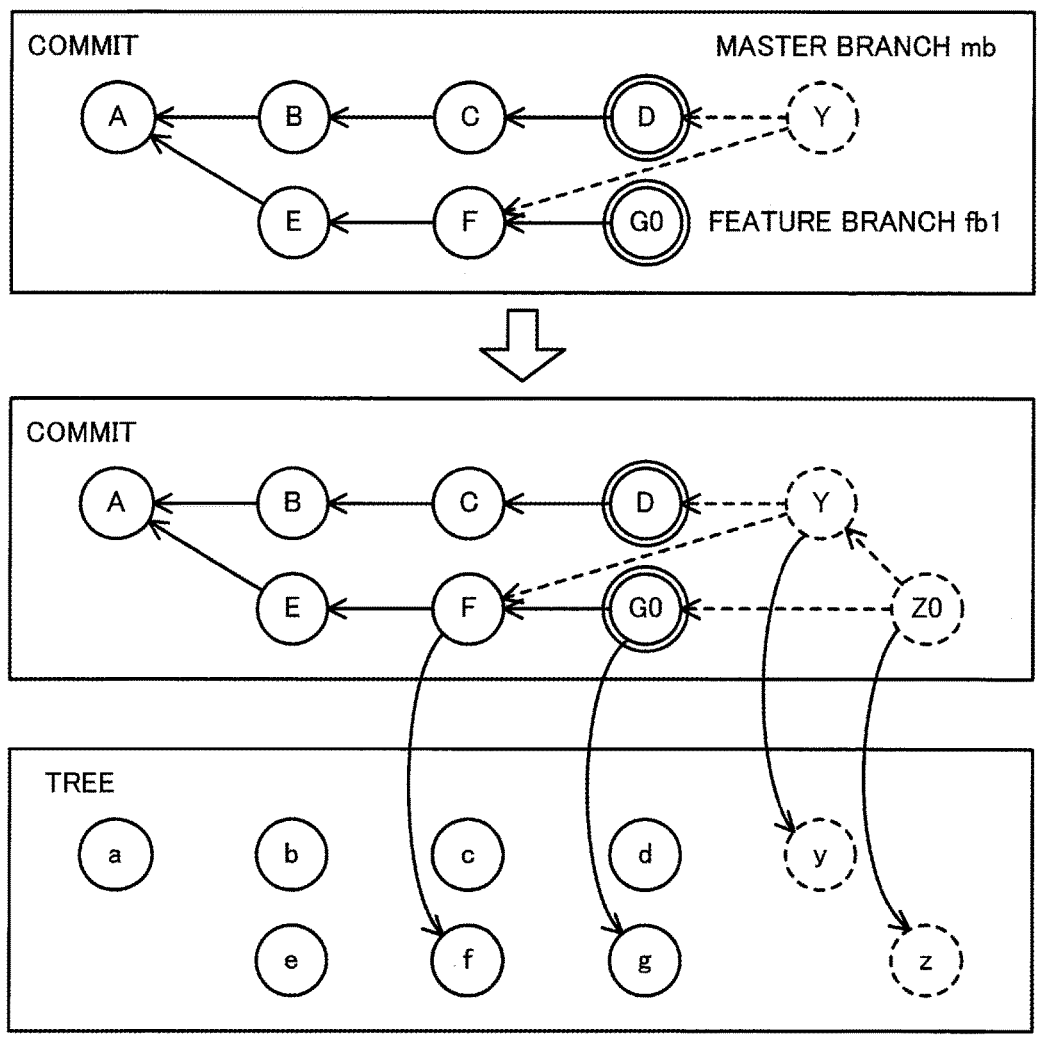
FIG. 7 illustrates a first example of merging using a previous merge result.

FIG. 7 illustrates a first example of merging using a previous merge result.

In this example, the last commit of the master branch mb is the commit D, and the last commit of the feature branch fb1 is the commit F. The master branch mb and the feature branch fb1 are merged. Then, the commit Y and the tree y corresponding to the merge result are stored in the repository so as to be invisible to the user. After that, a commit G0 referring to a tree g is added to the end of the feature branch fb1.

Upon merging again the master branch mb and the feature branch fb1, the information processing apparatus 100 determines whether any of the commits of the master branch mb and any of the commits of the feature branch fb1 have been previously merged. The determination of whether a merge has been previously performed is made on the basis of the commit graph also containing commits invisible to the user. In this example, the information processing apparatus 100 detects that the commit Y has been generated from the commits D and F as a merge result. Then, the information processing apparatus 100 determines to perform a merge based on the commit Y as the previous merge result and the commit G0, which is added to the feature branch fb1 after the previous merge, instead of performing a merge based on the commits D and G0.

In the case of performing merge based on the commits Y and G0, the closest common commit reachable from the commits Y and G0 is not the commit A, but is the commit F. Accordingly, the information processing apparatus 100 may extract changes between the tree f and the tree y, and changes between the tree f and the tree g, and apply the changes to the tree f so as not to cause a conflict. Thus, compared to the case where the closest common commit is the commit A, the amount of changes that are extracted is reduced, and hence the merge is performed more efficiently.

After that, the information processing apparatus 100 adds a commit Z0 and a tree z to the repository as a new merge result so as to be invisible to the user. The commit Z0 refers to the tree z as a root tree, and refers to the commits Y and G0 as parent commits. The generated tree z is the same as that generated by a merge not using a previous merge result.

Figure 8:
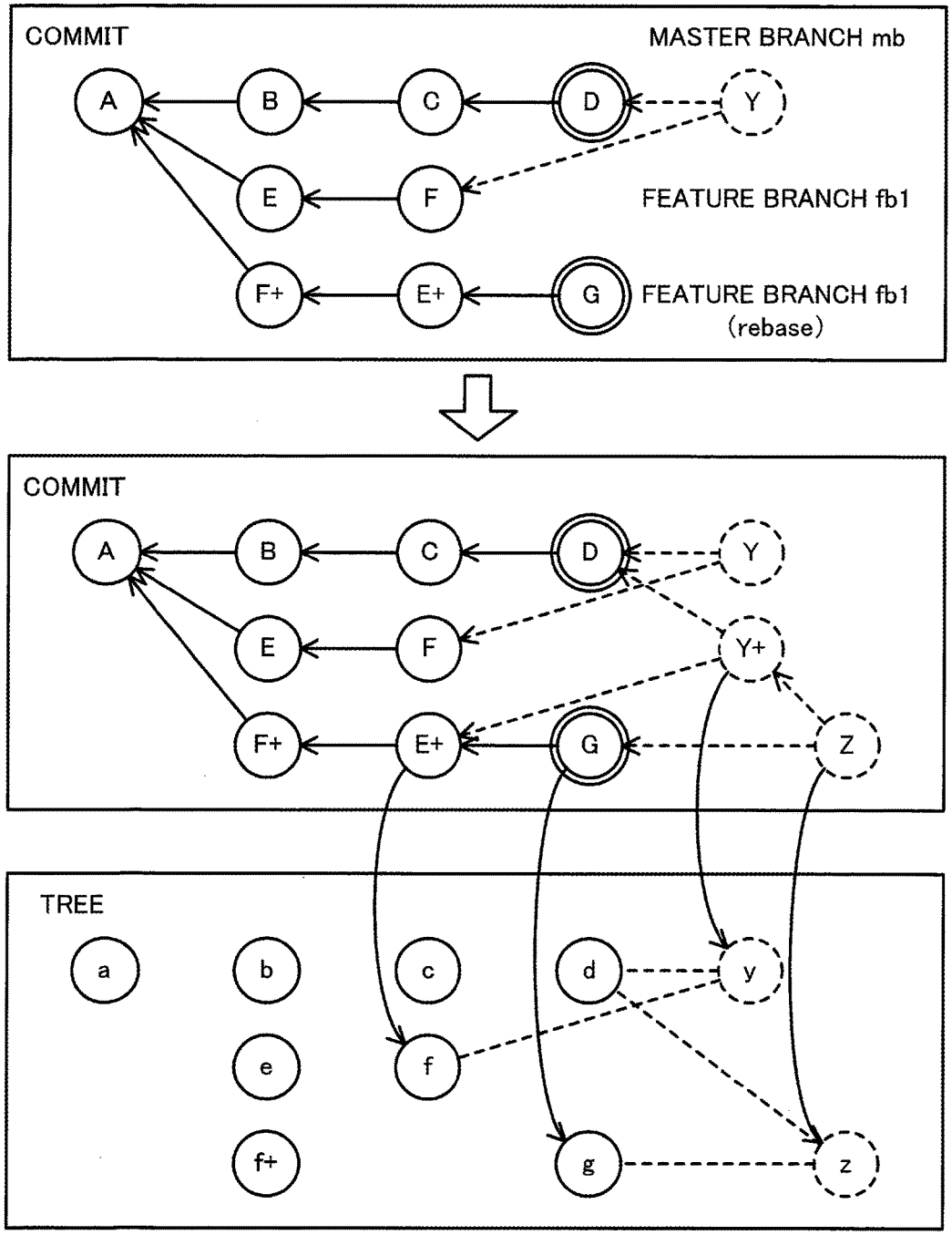
FIG. 8 illustrates a second example of merging using a previous merge result.

FIG. 8 illustrates a second example of merging using a previous merge result.

In this example, the last commit of the master branch mb is the commit D, and the last commit of the feature branch fb1 is the commit F. The master branch mb and the feature branch fb1 are merged. Then, the commit Y and the tree y are stored in the repository so as to be invisible to the user. Then, a commit sequence (E, F) of the feature branch fb1 is edited to be a commit sequence (F+, E+) by a rebase. After that, a commit G referring to a tree g is added to the end of the feature branch fb1.

At this point, the tree f referred to by the commit E+ after the rebase is the same as that referred to by the commit F before the rebase. Accordingly, upon merging again the master branch mb and the feature branch fb1, it is preferable that the information processing apparatus 100 use the previous merged tree y as in the case of FIG. 7. However, the commit F and the commit E+ are not identical to each other in the commit graph. A previous merge of any of the commits of the master branch mb and any of the feature branch fb1 before the rebase is not detected by simply searching the commit graph.

Thus, the information processing apparatus 100 stores a merge history at the tree level in the repository, separately from the commits of the merge results. In this example, when the merge before the rebase is performed, information indicating that the tree y is generated from the tree d referred to by the commit D and the tree f referred to by the commit F is registered in the merge history. Thus, upon performing the merge after the rebase, the information processing apparatus 100 is able to detect that the tree y has been previously generated from the tree d referred to by the commit D and the tree f referred to by the commit E+, on the basis of the merge history.

Then, the information processing apparatus 100 adds a commit Y+ referring to the tree y as a root tree and referring to the commits D and E+ as parent commits to the repository, such that a merging method may be determined on the basis of the commit graph. The commit Y+ is a pseudo-commit, and is invisible to the user. After that, the information processing apparatus 100 merges the master branch mb and the rebased feature branch fb1, in the same way as in FIG. 7.

That is, on the basis of the commit graph containing commits invisible to the user, the information processing apparatus 100 detects that the commit Y+ has been generated from the commits D and E+ as a merge result. Then, the information processing apparatus 100 determines to perform a merge based on the commits Y+ and G, instead of performing a merge based on the commits D and G. The closest common commit reachable from the commits Y+ and G is the commit E+. Accordingly, the information processing apparatus 100 extracts changes between the tree f and the tree y, and changes between the tree f and the tree g, and applies the changes to the tree f so as not to cause a conflict.

After that, the information processing apparatus 100 adds a commit Z and a tree z to the repository as a new merge result so as to be invisible to the user. The commit Z refers to the tree z as a root tree, and refers to the commits Y+ and G as parent commits. Further, the information processing apparatus 100 registers information indicating that the tree z is generated from the trees d and g, in the merge history.

Next, functions of the information processing apparatus 100 and the procedure of a merge process will be described.

Figure 9:
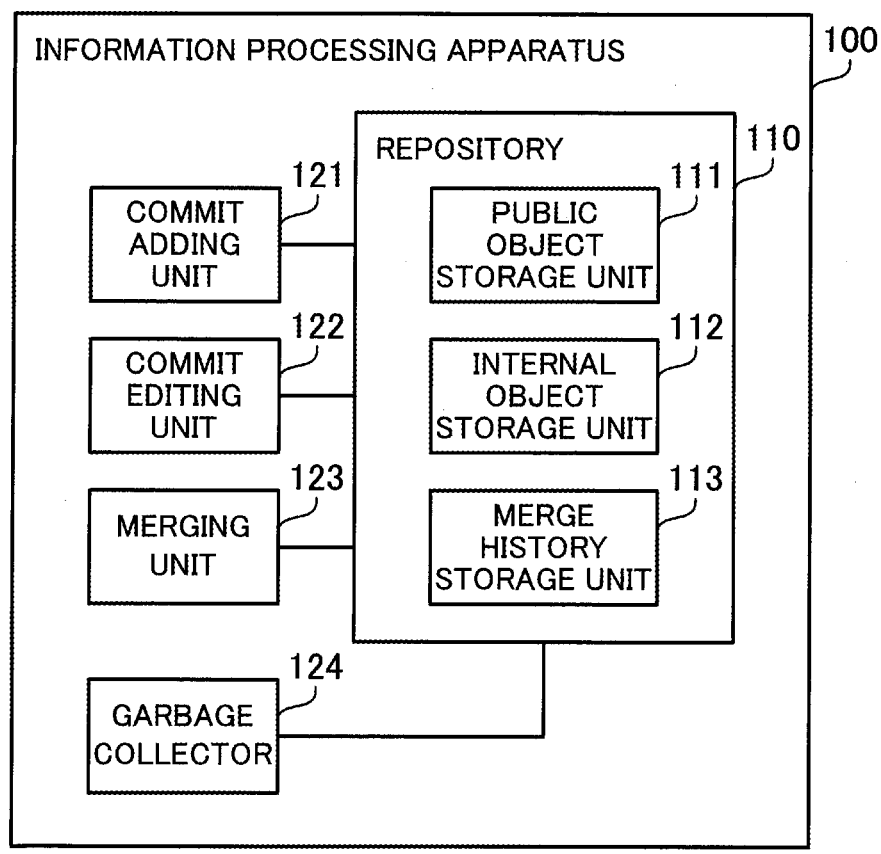
FIG. 9 illustrates an exemplary functional block diagram of the information processing apparatus according to a second embodiment.

FIG. 9 illustrates an exemplary functional block diagram of the information processing apparatus 100 according to the second embodiment.

The information processing apparatus 100 includes a repository 110, a commit adding unit 121, a commit editing unit 122, a merging unit 123, and a garbage collector 124. The commit adding unit 121, the commit editing unit 122, the merging unit 123, and the garbage collector 124 are realized as modules of software executed by the CPU 101, for example.

The repository 110 is a database that stores data on the version control. An example of the repository 110 may be a key-value based database (key-value store) that manages data as a pair of a key and a value. The repository 110 includes a public object storage unit 111, an internal object storage unit 112, and a merge history storage unit 113. These three storage units may be realized as a storage area reserved in the RAM 102 or the HDD 103, for example.

The public object storage unit 111 stores an object visible to the user in association with the object ID. The internal object storage unit 112 stores an object that is used internally and is invisible to the user in association with the object ID. In the case where a key-value store is used as the repository 110, the object ID corresponds to a key, and an object corresponds to a value. As mentioned above, types of objects that are stored include a commit, a tree, and a blob. The header and body of each object is compressed such that the object is stored as a file. The merge history storage unit 113 stores a merge history at the tree level indicating the correspondence between the merge source trees and a resulting merged tree.

The commit adding unit 121 receives a commit command from the user. Then, the commit adding unit 121 generates a set of trees and blobs while maintaining the directory structure, from a set of files in the file system that performs the version control. Then, the commit adding unit 121 calculates the ID of each of the generated trees and blobs, and stores each of the trees and blobs in association with the object ID in the public object storage unit 111. However, trees and blobs that identical to the existing trees and blobs are not redundantly stored.

Further, the commit adding unit 121 generates a commit referring to a root tree among a generated group of trees, calculates the object ID of the generated commit, and stores the commit in association with the object ID in the public object storage unit 111. In the case where there is at least a commit in the branch on which the user is working, the commit to be added refers to the current working commit in the branch as a parent commit.

The commit editing unit 122 receives a command for editing an existing commit, such as a rebase command and so on, from the user. Then, the commit editing unit 122 edits a commit stored in the public object storage unit 111, and calculates the object ID of the edited commit. Then, the commit editing unit 122 stores the edited commit in association with the object ID in the public object storage unit 111, separately from the commit before the editing. Further, in the case where editing a commit affects a tree, such as when rearranging the order of commits, the commit editing unit 122 determines the effects of the editing, and generates a tree on the basis of the determined effects. Then the commit editing unit 122 stores the tree in the public object storage unit 111.

The merging unit 123 receives a merge command from the user. Then, the merging unit 123 merges a plurality of branches in the manner described above. That is, the merging unit 123 refers to the merge history stored in the merge history storage unit 113, and detects a usable previous merge result. If there is no usable previous merge result, the merging unit 123 generates a merge result on the basis of the trees and blobs stored in the public object storage unit 111. On the other hand, if there is a usable previous merge result, the merging unit 123 generates a merge result using also the trees and blobs stored in the internal object storage unit 112.

Then, the merging unit 123 stores a commit and a tree generated as the merge result in the internal object storage unit 112. Further, the merging unit 123 registers the correspondence between the merge source trees and a resulting merged tree, in the merge history stored in the merge history storage unit 113.

The garbage collector 124 performs garbage collection at intervals specified by the user. The garbage collector 124 traces the reference relationship among the objects stored in the public object storage unit 111 and the internal object storage unit 112. The garbage collector 124 detects, among these objects, an isolated object (an unnecessary object) that is not referred to by other objects. Then, the garbage collector 124 removes the isolated object from the public object storage unit 111 and the internal object storage unit 112.

FIG. 10 illustrates an example of a merge history table 114.

The merge history table 114 is a table for registering a merge history, and is stored in the merge history storage unit 113 of the repository 110. The merge history table 114 contains a "parent tree" field and a "merge result" field. The "parent tree" field contains the tree IDs of two or more root trees that are merged. The "merge result" field contains the tree ID of a root tree generated as the merge result. For example, in the merge history table 114, the trees d and f as the parent trees and the tree y as the merge result are registered in association with each other.

Figure 11:
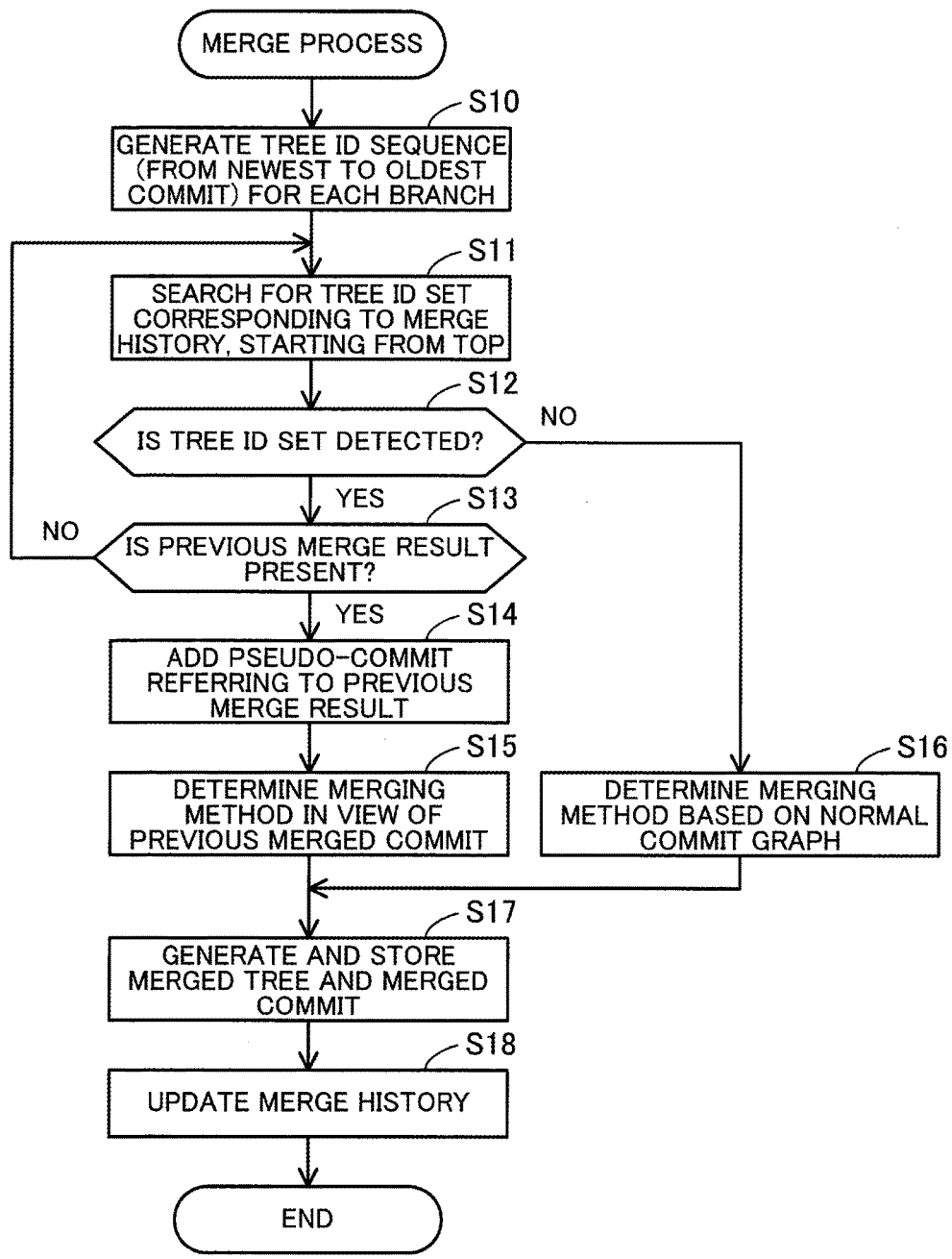
FIG. 11 is a flowchart illustrating an exemplary procedure of a merge process according to the second embodiment.

FIG. 11 is a flowchart illustrating an exemplary procedure of a merge process according to the second embodiment.

(S10) The merging unit 123 traces a commit sequence from the last commit (or the working commit) toward a common commit, for each of a plurality of branches to be merged. The merging unit 123 generates a tree ID sequence, in which tree IDs of root trees referred to by commits are listed in the order of the commits, for each branch.

For example, in the case of the example of FIG. 8, the merging unit 123 generates a tree ID sequence indicating a tree sequence (d, c, b, a) corresponding to a commit sequence (D, C, B, A), for the master branch mb. Further, the merging unit 123 generates a tree ID sequence indicating a tree sequence (g, f, f+, a) corresponding to a commit sequence (G, E+, F+, A), for the feature branch fb1.

(S11) The merging unit 123 searches for a set of tree IDs that is registered in the "parent tree" field of the merge history table 114, among sets of tree IDs, each of which is obtained by selecting a tree ID from each of the plurality of tree ID sequences generated in step S10. In this step, the merging unit 123 compares the tree ID sequence with the tree IDs in the "parent tree" field of the merge history table 114, starting from the top of each tree ID sequence (that is, starting with the tree ID of the tree of the latest version).

(S12) The merging unit 123 determines whether the set of tree IDs registered in the "parent tree" field of the merge history table 114 is detected. For example, in the case of the example of FIG. 8, a set of trees <d, f> registered in the "parent tree" of the merge history table 114 is detected from the tree sequence (d, c, b, a) and the tree sequence (g, f, f+, a). If the set of tree IDs is detected, the process proceeds to step S13. If not, the process proceeds to step S16.

(S13) The merging unit 123 obtains the tree ID of the merge result corresponding to the detected set of tree IDs, from the merge history table 114. Then, the merging unit 123 determines whether a tree with the obtained tree ID is present in the internal object storage unit 112. The tree might not be present in the case where the tree is removed from the internal object storage unit 112 by garbage collection. If the tree is present, the process proceeds to step S14. If not, the process returns to step S11, in which a set of tree IDs that satisfies the condition is searched for toward the end of each tree ID sequence.

(S14) The merging unit 123 specifies a set of commits corresponding to the set of tree IDs detected in step S11, from the commit sequences of a plurality of branches. Then, the merging unit 123 generates a pseudo-commit referring to the specified set of commits as parent commits and referring to the resulting merged tree confirmed in step S13 as a root tree. The merging unit 123 stores the generated pseudo-commit in the internal object storage unit 112. In the case where the same merged commit is already present, the generated pseudo-commit does not need to be redundantly stored.

(S15) The merging unit 123 determines a merging method in view of the previous merged commit. In this step, the merging unit 123 uses a commit graph containing both the commits stored in the public object storage unit 111, which are visible to the user, and the commits stored in the internal object storage unit 112, which are invisible to the user. In the example of FIG. 8, the merging unit 123 determines to merge the commits Y+ and G, instead of merging the commits D and G. Thus, the master branch mb and the rebased feature branch fb1 are merged using the previous merged tree y. After that, the process proceeds to step S17.

(S16) The merging unit 123 determines a merging method, regardless of the previous merged commit. In this step, the merging unit 123 may use a commit graph not containing the commits stored in the internal object storage unit 112, which are invisible to the user.

(S17) The merging unit 123 generates a merged tree in accordance with the merging method determined in step S15 or S16, and stores the generated tree in the internal object storage unit 112. Further, the merging unit 123 generates a merged commit referring to the merged tree, and stores the generated commit in the internal object storage unit 112. This commit refers to two or more commits that are merged, as parent commits. In the example of FIG. 8, since the commits Y+ and G are merged instead of merging the commits D and G, the resulting merged commit Z refers to the commits Y+ and G.

(S18) The merging unit 123 specifies a tree referred to by the last commit visible from the user (or the working commit), for each of a plurality of branches to be merged. Then, the merging unit 123 registers the tree IDs of the specified trees (parent trees) and the tree ID of the resulting merged tree in association with each other in the merge history table 114. In the example of FIG. 8, the trees d and g are parent trees, and the tree z is the resulting merged tree.

According to the information processing apparatus 100 of the second embodiment, it is possible to merge a plurality of branches using a previous merged tree. Accordingly, it is possible to reduce the amount of calculation and the number of times of access to the repository, and thus to reduce the workload for merging a plurality of branches, compared to the case of extracting changes from the time when the branches are forked.

Further, since the previous merged commit is added to the commit graph, it is easy to detect a common commit reachable from the last commit (or the working commit) of each of the plurality of branches. Thus, it is possible to efficiently determine a merging method using the previous merge result. Further, the merge history at the tree level is referred to. Therefore, even if a commit is edited by rebasing or the like and thus the commit after the editing is different from the commit before the editing, it is possible to detect a previous merged tree that is substantially usable and to reflect the tree to the commit graph. This increases the chance that a previous merge result may be used. Thus, a merge operation may be performed efficiently.

(c) Third Embodiment

Hereinafter, a third embodiment will be described. The following mainly discusses the differences from the second embodiment, and will not further describe the same features as those of the second embodiment. The information processing apparatus of the third embodiment makes it possible to use a previous merge result at the subtree level, even when the previous merge result is not usable at the root tree level. The information processing apparatus of the third embodiment may be realized with the same block configuration as those of FIGS. 2 and 9. In the following, the third embodiment will be described using the same reference numbers as those used in FIGS. 2 and 9.

Figure 12:
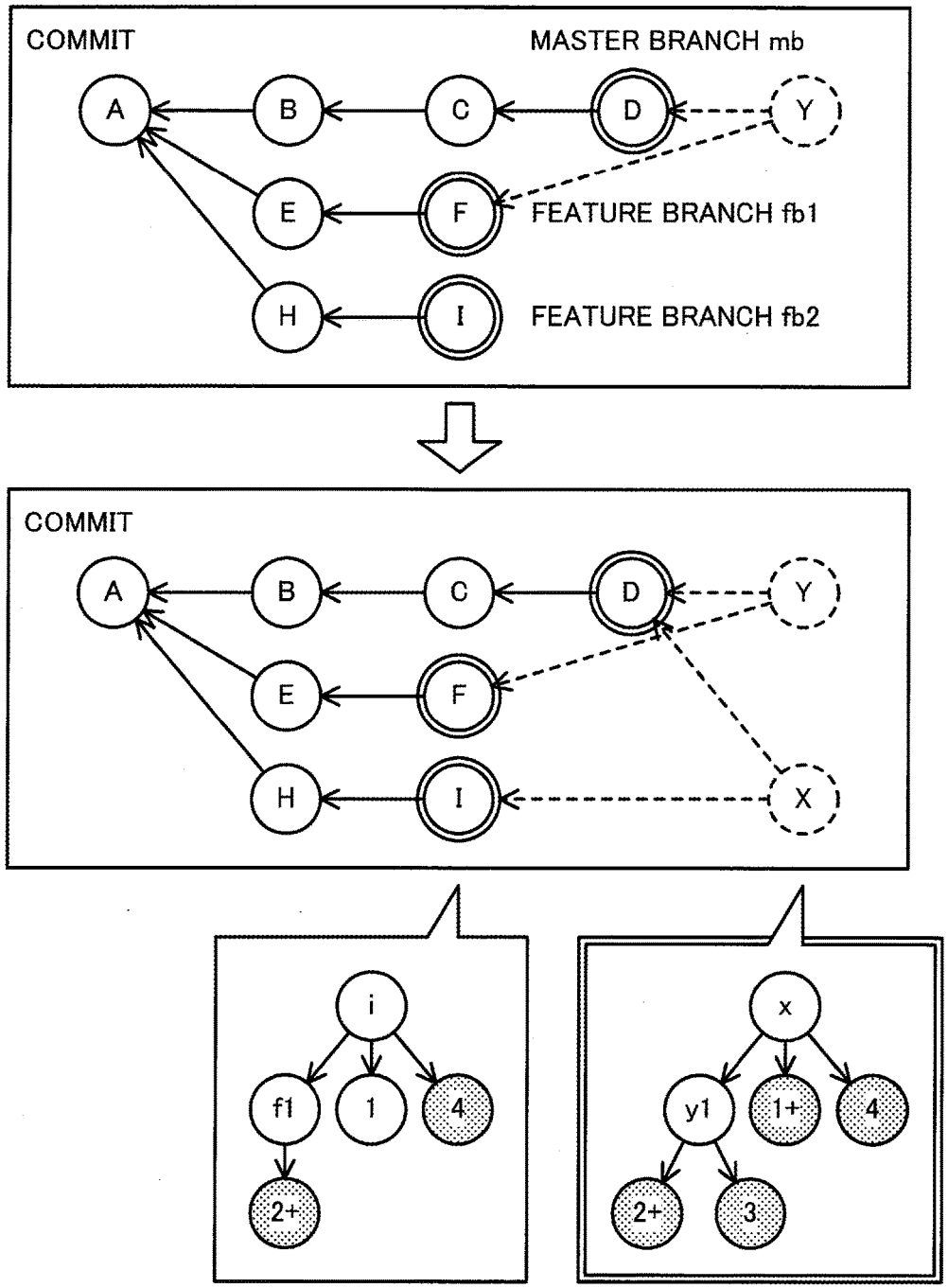
FIG. 12 illustrates a third example of merging using a previous merge result.

FIG. 12 illustrates a third example of merging using a previous merge result.

In this example, a master branch mb and feature branches fb1 and fb2 are represented in a commit graph. The master branch mb contains a commit sequence (A, B, C, D). The feature branches fb1 and fb2 are forked from the commit A of the master branch mb. The feature branch fb1 contains a commit sequence (E, F), and the feature branch fb2 contains a commit sequence (H, I).

First, the master branch mb and the feature branch fb1 are merged, and a commit Y and a tree y as the merge result are stored in the repository so as to be invisible to the user. At this point, the commit D of the master branch mb refers to the tree d of FIG. 5 as a root tree, and the commit F of the feature branch fb1 refers to the tree f of FIG. 5 as a root tree. Upon generating the tree y by merging the trees d and f, the information processing apparatus 100 generates a tree y1 by merging subtrees d1 and f1.

After that, the master branch mb and the feature branch fb2 are merged, and a commit X and a tree x as the merge result are stored in the repository so as to be invisible to the user. At this point, the commit I of the feature branch fb1 refers to a tree i as a root tree. The blobs 1, 2+ , and 4 and the tree f1 are reachable from the tree i. The blobs 1+, 2+, 3, and 4 and the tree y1 are reachable from the tree x.

Upon generating the tree x by merging the trees d and i, a previous merge result is not usable at the root tree level by the information processing apparatus 100. However, since the tree y1 is generated by merging the tree d1 and f1, a part of the previous merge result is usable at the subtree level. Thus, the information processing apparatus 100 also holds a merge history at the subtree level.

FIG. 13 illustrates an example of a sub-merge history table 115.

The sub-merge history table 115 is a table for registering a merge history at the subtree level, and is stored in the merge history storage unit 113 of the repository 110. The sub-merge history table 115 contains a "subtree" field and a "merge result" field. The "subtree" field contains the tree IDs of two or more subtrees (trees other than the root trees referred to by commits) that are merged. The "merge result" field contains the tree ID of a subtree generated as the merge result. For example, in the sub-merge history table 115, the trees d1 and f1 as the merge sources and the tree y1 as the merge result are registered in association with each other.

Figure 14:
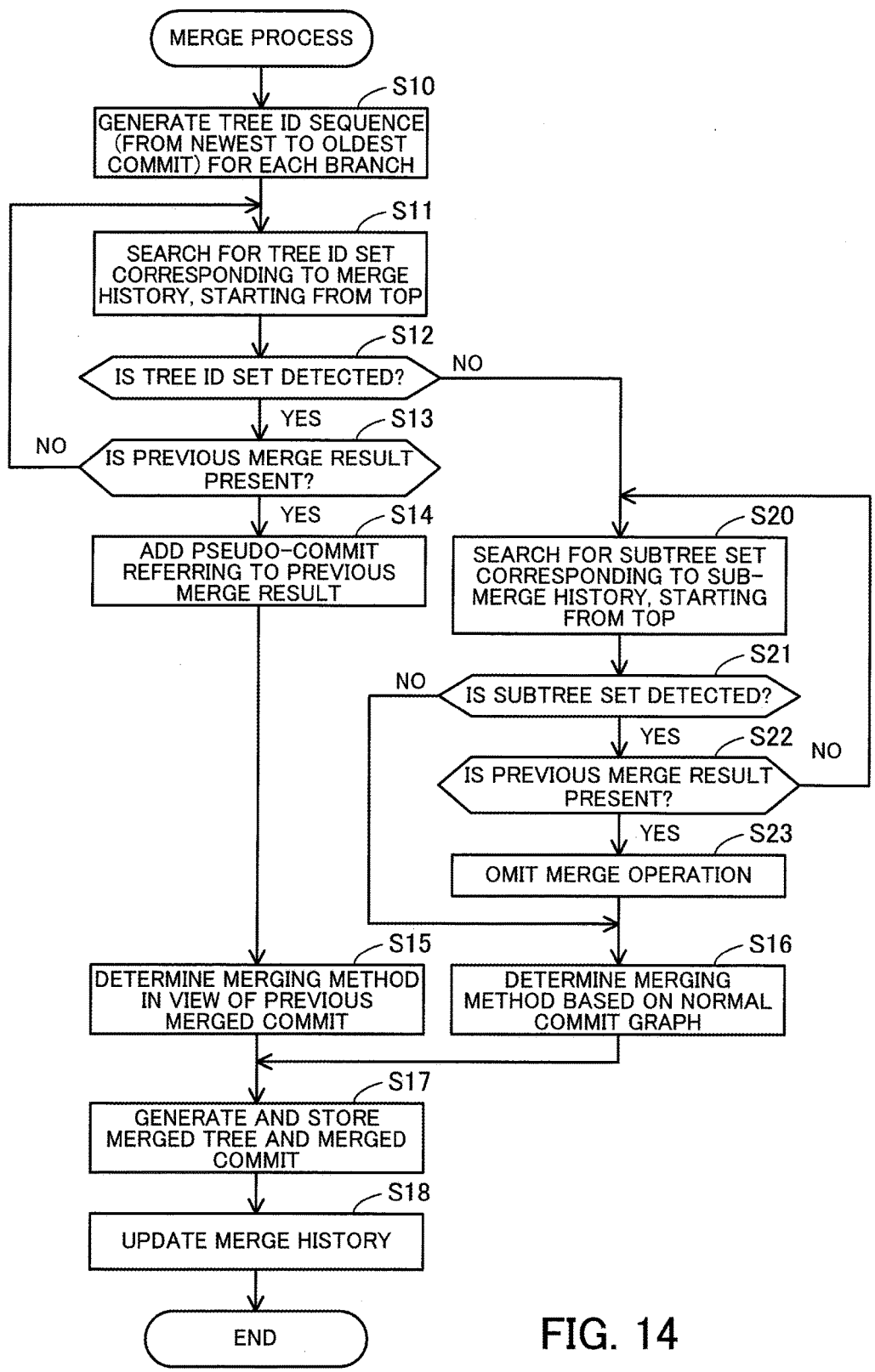
FIG. 14 is a flowchart illustrating an exemplary procedure of a merge process according to a third embodiment.

FIG. 14 is a flowchart illustrating an exemplary procedure of a merge process according to the third embodiment.

Steps S10 through S18 are the same as those of the merge process of the second embodiment illustrated in FIG. 11. In the merge process of the third embodiment, when the information processing apparatus 100 determines that a previous merge result that is usable at the root tree level is not present, the following steps S20 through S23 are performed between the steps S12 and S16.

(S20) The merging unit 123 specifies a root tree referred to by the last commit (or the working commit), for each of a plurality of branches to be merged. Then, the merging unit 123 searches for a set of tree IDs that is registered in the "subtree" field of the sub-merge history table 115, among sets of tree IDs, each of which indicates a set of subtrees obtained by selecting a subtree under each of a plurality of root trees. In this step, the merging unit 123 performs the search, starting from the tree closest to the root of the tree structure (that is, from the root toward the leaves).

(S21) The merging unit 123 determines whether the set of tree IDs registered in the "subtree" field of the sub-merge history table 115 is detected. For example, in the case of the example of FIG. 12, a set of trees <d1, f1> registered in the sub-merge history table 115 is detected from a group of subtrees under the tree d and a group of subtrees under the tree i. If the set of tree IDs is detected, the process proceeds to step S22. If not, the process proceeds to step S16.

(S22) The merging unit 123 obtains the tree ID of the merge result corresponding to the detected set of tree IDs, from the sub-merge history table 115. Then, the merging unit 123 determines whether a subtree with the obtained tree ID is present in the internal object storage unit 112. The subtree might not be present in the case where the subtree is removed from the internal object storage unit 112 by garbage collection. If the subtree is present, the process proceeds to step S23. If not, the process returns to step S20, in which a set of subtrees that satisfies the condition is searched for toward the leaves of each tree structure.

(S23) The merging unit 123 determines to omit a merge operation for the subtrees with the tree IDs detected in step S21. In this case, the tree at the immediately higher level in the resulting merged tree structure may refer to the previous merged subtree.

In the third embodiment, the merging unit 123 updates the sub-merge history table 115, in addition to the merge history table 114, in step S18. That is, the merging unit 123 specifies the correspondence between the subtrees reachable from the root trees of the merge sources and the subtree reachable from the root tree of the merge result, and registers the correspondence in the sub-merge history table 115.

According to the third embodiment, the same effects as those of the second embodiment are achieved. Further, according to the third embodiment, even when a previous merge result is not usable at the root tree level, the previous merge result may be used at the subtree level. Accordingly, it is possible to merge a plurality of branches more efficiently.

As mentioned above, the information processing in the first embodiment may be realized by causing the information processing apparatus 10 to execute a program. Further, the information processing in each of the second and third embodiments may be realized by causing the information processing apparatus 100 to execute a program.

The program may be recorded in a computer-readable medium (for example, the recording medium 23). Examples of recording media include magnetic disks, optical discs, magneto-optical disks, semiconductor memory devices, and the like Magnetic disks include FD and HDD. Optical discs include CD, CD-Recordable (CD-R), CD-Rewritable (CD-RW), DVD, DVD-R, and DVD-RW. The program may be stored in a portable recording medium so as to be distributed. In this case, the program may be copied (installed) from the portable recording medium to other recording media such as HDD and the like (for example, the HDD 103) so as to be executed.

According to one aspect, it is possible to efficiently merge a plurality of branches.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a procedure comprising:
    managing a version control graph that contains a plurality of nodes and represents relationships among a plurality of versions produced from an original data set, the nodes each having a node identifier thereof and a data identifier referring to a data set of a specific version;
    permitting editing of information held by an existing node in the version control graph;
    producing, upon merging a first branch and a second branch contained in the version control graph, a first series of data identifiers of the nodes on the first branch, as well as a second series of data identifiers of the nodes on the second branch, by tracing the nodes along the first branch and the nodes along the second branch;
    managing merge history information to record data identifiers of previously merged data sets and resulting data sets produced therefrom;
    searching the merge history information for each of a plurality of possible pairs of data identifiers produced by selecting the first series of data identifiers one by one in reverse order of versions of data sets corresponding to the nodes on the first branch, selecting the second series of data identifiers one by one in reverse order of versions of data sets corresponding to the nodes on the second branch, and combining two data identifiers respectively selected out of the first series and the second series; and
    generating, when the searching has found one of the possible pairs of data identifiers in the merge history information, a new merged data set by merging the first branch and the second branch, using a resulting data set produced as a result of previous merging of data sets corresponding to the found pair of data identifiers.

2. The non-transitory computer-readable storage medium according to claim 1, wherein the procedure further comprises:

adding, to the version control graph, another node referring to the one of the resulting data sets that corresponds to the found pair of data identifiers, and determining a way to merge the first branch and the second branch, on the basis of the version control graph containing the added node.

3. The non-transitory computer-readable storage medium according to claim 1, wherein:

the merge history information further includes records of previously performed merging of sub-data sets as part of data sets;

the procedure further comprises detecting in the merge history information a record of previously performed merging of sub-data sets as part of two data sets respectively referred to by end nodes of the first and second branches, when the searching has found none of the possible pairs of data identifiers; and the generating includes generating the new merged data set by merging the first branch and the second branch, using the detected record.

4. The non-transitory computer-readable storage medium according to claim 1, wherein the editing includes rearranging the order of nodes in a branch.

5. A version control method comprising:

managing, by a processor, a version control graph that contains a plurality of nodes and represents relationships among a plurality of versions produced from an original data set, the nodes each having a node identifier thereof and a data identifier referring to a data set of a specific version;

permitting editing of information held by an existing node in the version control graph;

producing, by the processor upon merging a first branch and a second branch contained in the version control graph, a first series of data identifiers of the nodes on the first branch, as well as a second series of data identifiers of the nodes on the second branch, by tracing the nodes along the first branch and the nodes along the second branch toward a common node at which the first and second branches meet;

managing, by the processor, merge history information to record data identifiers of previously merged data sets and resulting data sets produced therefrom;

searching, by the processor, the merge history information for each of a plurality of possible pairs of data identifiers produced by selecting the first series of data identifiers one by one in reverse order of versions of data sets corresponding to the nodes on the first branch, selecting the second series of data identifiers one by one in reverse order of versions of data sets corresponding to the nodes on the second branch, and combining two data identifiers respectively selected out of the first series and the second series; and generating, by the processor when the searching has found one of the possible pairs of data identifiers in the merge history information, a new merged data set by merging the first branch and the second branch, using a resulting data set produced as a result of previous merging of data sets corresponding to the found pair of data identifiers.

* * * * *